Oct. 7, 1924.　　　　P. W. TIERNEY ET AL　　　　1,510,722
LENS CARRIAGE FOR PHOTOGRAPHIC CAMERAS
Filed March 16, 1922
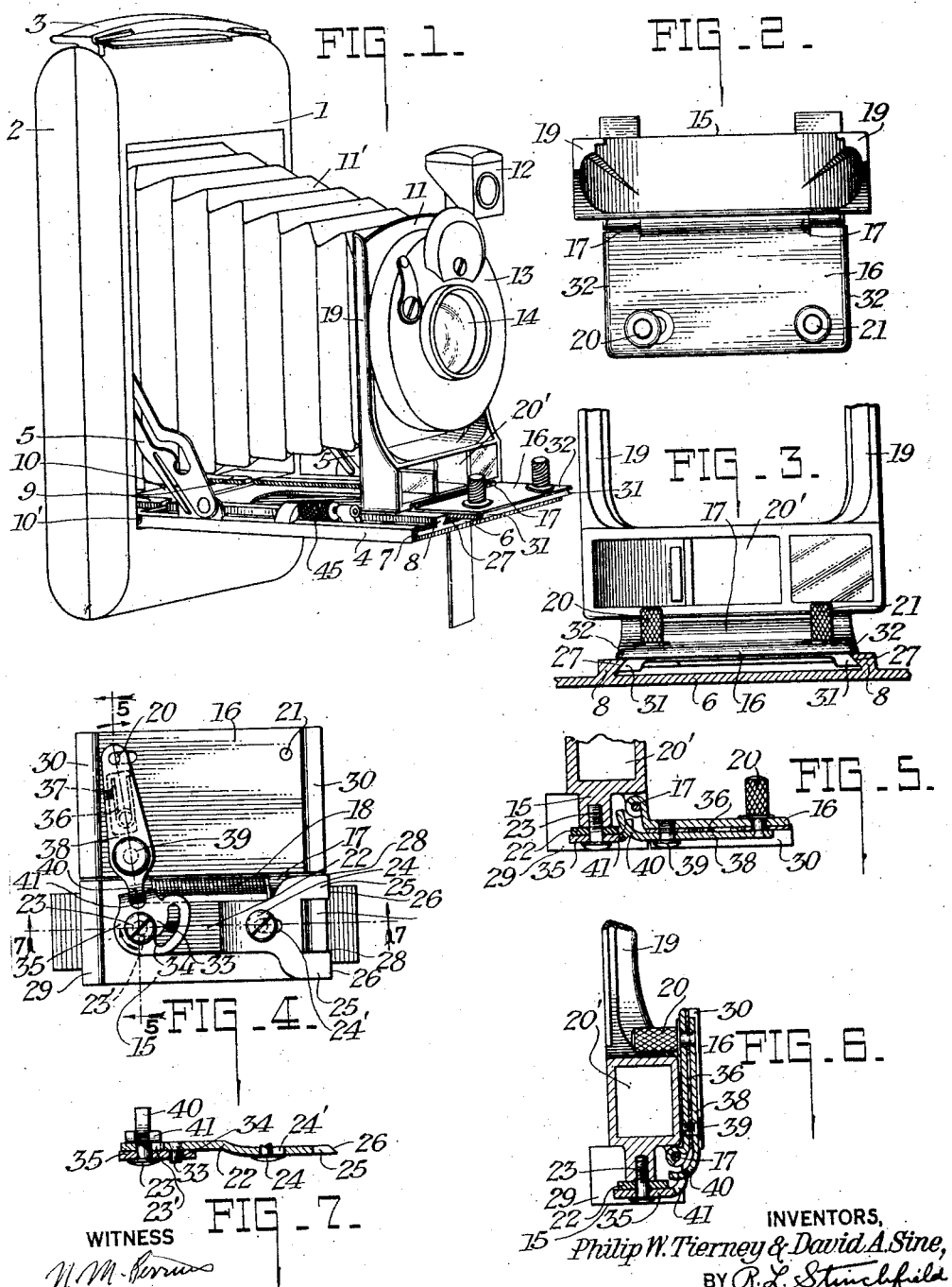
INVENTORS,
Philip W. Tierney & David A. Sine,
BY R. L. Stinchfield
ATTORNEYS.
WITNESS Patented Oct. 7, 1924.

1,510,722

UNITED STATES PATENT OFFICE.

PHILIP W. TIERNEY AND DAVID A. SINE, OF ROCHESTER, NEW YORK, ASSIGNORS TO EASTMAN KODAK COMPANY, OF ROCHESTER, NEW YORK, A CORPORATION OF NEW YORK.

LENS CARRIAGE FOR PHOTOGRAPHIC CAMERAS.

Application filed March 16, 1922. Serial No. 544,278.

*To all whom it may concern:*

Be it known that we, PHILIP W. TIERNEY and DAVID A. SINE, citizens of the United States of America, residing at Rochester, in the county of Monroe and State of New York, have invented certain new and useful Improvements in Lens Carriages for Photographic Cameras, of which the following is a full, clear, and exact specification.

This invention relates to photography and more particularly to photographic cameras of the compact folding type in which the lens is carried by a carriage which is moved along tracks on the camera bed into a picture-taking position. To adjust the focus of the camera the lens is moved relatively to the camera body. This invention has for its object to provide a simple, cheap and efficient construction for a lens carriage which can fold into a small space; another object is to provide a clamp which will attach the carriage to the track; another object is to provide a clamp-operating grip which can be easily operated; another object is to provide folding operative connections between the clamp and the grip; another object is to provide such connections which will be operative in any position of the parts; and other objects will appear hereinafter, the novel features being pointed out in the claims at the end of the specification.

In the drawings, in which like reference characters denote like parts throughout:

Fig. 1 is a perspective view of a camera having a lens carriage constructed in accordance with, and illustrating one form of our invention;

Fig. 2 is a top plan view of the carriage removed from the camera;

Fig. 3 is a front elevation of the carriage with the track in section;

Fig. 4 is a bottom plan view of the carriage, clamp, and clamp-operating mechanism;

Fig. 5 is a section on line 5—5 of Fig. 4;

Fig. 6 is a section as in Fig. 5, but with the sections in folded position; and

Fig. 7 is a section of certain parts taken on line 7—7 of Fig. 4.

The camera consists of a body portion 1, having the usual removable back 2, handle 3, and bed 4. The bed is supported by braces 5 and is provided with a slide plate 6 which slides in the grooves 7 (only one being shown) of the bed 4. Tracks 8 are carried by the slide plate 6, and similar tracks 9 are in alignment with these tracks but are attached to the inside 10 of the camera body 1. When the camera is folded the tracks 8 and 9 are at approximately right angles to each other, as the bed 4 turns about a hinge 10'. A bellows 11' extends between the camera body 1 and the lens board 11, upon which there is a finder 12, shutter 13 and lens 14.

The lens carriage consists of two sections 15 and 16 hinged together at 17 and normally held in unfolded position by a coiled spring 18 (Fig. 4). Section 15 supports a yoke 19 which carries the lens board 11, and beneath which there may be a range finder 20', but this obviously is not essential and forms no part of this invention. Section 16 carries the finger grips 20 and 21, the former being movable and the latter fixed with respect to section 16.

A clamping bar 22 has slots 23' and 24' whereby it slides upon studs 23 and 24 attached to section 15. The end of this bar is bifurcated as shown at 25 and the bifurcations are beveled at 26 to engage the beveled edge 27 of the track 8. These parts extend through openings 28 in one of the runners 29, which, like runners 30 of section 16, are shaped to slide freely on tracks 8, the lower portions being beveled at 31 (Fig. 3) and flanges 32 resting on the upper edges of the tracks 8. The clamping bar 22 is normally held in operative position in binding engagement with the tracks 8 by the following mechanism: A pin 33 fastened to the bar 22 extends up through the cam slot 34 of plate 35 which is mounted to turn about stud 23, being actuated by a spring 36 acting upon lug 37 of lever 38 which is thus turned upon stud 39. A tongue 40 on lever 38 is engaged by a yoke 41 on plate 35, so that these parts are always in operative engagement irrespective of the position of sections 15 and 16 (Figs. 5 and 6). The outer end of lever 38 carries the movable finger grip 20. Pressure on this member in direction of arrow (Fig. 4) compresses the spring 36 causing plate 35 to draw in upon pin 33 through the action of the cam slot 34, thus retracting the clamping bar from its binding engagement with a track 8, and permitting a free movement of the carriage. As the grip is on the long end of lever 38, the mechanical advantage is such that a comparatively heavy spring 36 can be readily moved. The spring is also located in a position to give it efficient leverage. Releasing the grips causes the reverse of the above described movements.

There are a number of advantages in the cam slot 34 which acts on pin 33. The angle of the slot is such that the clamping bar is held firmly in its locking position and an attempt to move the carriage without releasing the clamp has but little, if any tendency to react through the operating mechanism. In other words the finger grip cannot be moved by exerting pressure upon the locking bar. This always retains the lens carriage locked in the desired position.

The tongue 40 and yoke 41, not only permit the sections 15 and 16 to fold, but the clamp acting on the section 15 holds the lens supporting structure rigid to the tracks when in either a folded or a picture-taking position. After drawing out the carriage it is only necessary to move slide plate 6 relative to the bed 4 by the mechanism shown at 45 to focus the camera. When closing the camera the clamping feature is particularly useful, because it holds one section rigid to the track while the other section is free to slide upon the track, so that the folding movement is greatly facilitated. When both sections are permitted to slide, such as has hitherto been the case, there is danger that the hinges of the bed and of the carriage will not be in proper position relative to each other, so that either the track or carriage may become distorted as the camera is forced to a closed position. With our invention, however, such is not the case. The position of the carriage hinge is accurately located with respect to the bed hinge 10′, so that the carriage hinge 17 is free to fold when the carriage is moved to its innermost position. As section 15 is firmly held in this position by the clamping bar, and as section 16 may slide on track 8 to adjust itself as the bed is moved upon its hinge 10′, the closing movement is always uniform and there is no danger of springing or bending parts of the camera.

Having thus described our invention, what we claim as new and desire to secure by Letters Patent is:

1. In a folding camera having a bed with tracks thereon, the combination with two folding sections forming a lens carriage, one section carrying a clamp, the other section carrying a clamp-operating grip, of foldable operative connections between the clamp and the grip, said connections folding with the sections upon which they are respectively mounted.

2. In a folding camera, the combination with a bed, a camera body and of tracks on the bed, and tracks in the camera body, a lens carriage slidable on the tracks composed of two hinged sections, a clamping device on one section adapted to clamp the section on the bed track or on the tracks in the camera body.

3. In a folding camera, the combination with a camera body and a bed hinged thereto, of tracks on the bed, and tracks in the camera body, a foldable lens carriage adapted to slide on the tracks, a clamping mechanism on one of the foldable sections adapted to engage and bind upon the tracks in the camera body, whereby one section will be held to the tracks in the camera body against movement as the camera is folded and the other section will be free to slide upon the tracks on the bed.

4. In a folding camera, the combination of a bed, tracks on the bed, a body, and tracks in the body, of a foldable lens carriage slidable over the tracks, one of the foldable sections being adapted to engage the camera body tracks when the camera is in position for folding, and means for clamping the section to the track in the camera body, said means being operatively connected to the other foldable section.

5. In a folding camera, the combination with a bed having tracks thereon and a body having tracks therein, of a two-part lens carriage slidable on the tracks, a hinge between the two sections, a track clamp on one section, a clamp-operating member on the other section, and foldable connections between the clamp and operating members to permit the folding of the parts of the lens carriage as the camera is folded.

6. The combination with a folding camera having a bed with tracks thereon and a body having tracks therein, of a two-part lens carriage adapted to slide on the tracks, a track clamp comprising a sliding bar carried by one part of the lens carriage, a cam for operating the clamp, and means on the other part of the carriage for actuating the cam.

7. The combination with a folding camera having a bed with tracks thereon and a body with tracks therein, of a two-part lens carriage adapted to slide on the tracks, a track clamp comprising a sliding bar carried by one part of the lens carriage, a cam for operating the clamp, and means on the other part of the carriage for actuating the cam, said means including a lever, and a spring for moving the lever in one direction.

8. The combination with a folding camera having a bed with tracks thereon and a body having tracks therein, of a hinged lens carriage adapted to slide on the tracks and fold with the camera, a clamp for holding one hinged section to the track consisting of a sliding bar, a cam member for moving the bar, a lever for moving the cam member, a curved end on the lever engaging the cam member, said end being adapted to remain in operative contact with the cam member in all positions of the lens carriage.

9. The combination with a folding camera having a bed with tracks thereon and a body having tracks therein, of a two-part lens carriage, a hinge between the two parts of the carriage, a clamping mechanism on one part and a clamp-operating member on the other part, said clamp-operating member having a curved end, a yoke on a portion of the clamping mechanism adapted to engage the curved end of the clamp-operating member, whereby an operative connection between these parts will be retained in all positions of the two-part lens carriage.

Signed at Rochester, New York, this 13th day of March, 1922.

PHILIP W. TIERNEY.
DAVID A. SINE.